Patented Dec. 12, 1933

1,939,351

UNITED STATES PATENT OFFICE 1,939,351

PROCESS OF DISSOLVING PHOSPHATE ROCK AND OF SEPARATING ITS CONTENT OF LIME AND PHOSPHORIC ACID

Erling Johnson, Odda, Norway, assignor to the firm Odda Smelteverk A/S, Odda, Norway No Drawing. Application September 24, 1930, Serial No. 484,241, and in Norway September 28, 1929

2 Claims. (Cl. 23—165)

In my prior application Ser. No. 391,506, now Patent No. 1,816,285, I have disclosed a process for treating rock phosphate with nitric acid and separating the lime and phosphoric acid of the rock phosphate. According to said application the rock phosphate is dissolved in nitric acid of medium grade and from the solution obtained, a very great part of the calcium nitrate is caused to crystallize so that after filtration of the crystals a mother liquor is obtained which contains the phosphoric acid of the rock phosphate.

My present invention relates to some special measures for carrying out this process in a convenient manner. The said measures are particularly important when it is desired to obtain the highest possible concentration of phosphoric acid in the mother liquor and a possibly complete separation of calcium nitrate. Said measures have for their purpose to eliminate the inconveniences which arise when relatively strong nitric acid of say 60-75% is used in theoretically required quantities or in very slight excess, because in this case the solution of rock phosphate in nitric acid, and also the mother liquor from the calcium nitrate, respectively the mixture of solution and crystals before filtration of the latter, becomes so viscous and sticky that the operations of dissolving, crystallizing, and agitation as well as the interchange of heat is greatly impeded.

In this connection it may be mentioned that if pure tri-calcium phosphate is treated with the theoretical quantity of nitric acid of exactly 63,7% just sufficient water is supplied to yield the entire amount of lime as crystallized solid calcium nitrate $Ca(NO_3)_2.4H_2O$ and phosphoric acid of 100 per cent according to the equation

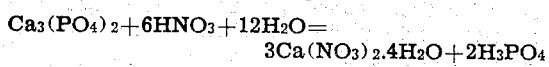

$$Ca_3(PO_4)_2 + 6HNO_3 + 12H_2O = 3Ca(NO_3)_2.4H_2O + 2H_3PO_4$$

If nitric acid of the said strength were used the product of reaction should theoretically be a mixture of crystallized calcium nitrate and phosphoric acid of 100 per cent.

With such a product it is however very difficult to obtain efficient separation of the thick concentrated phosphoric acid and the calcium nitrate crystals. Already when nitric acid of little more than 60 per cent is used a certain surplus of acid, f. i. 15-100 per cent, is necessary in order to dilute the phosphoric acid so that a filterable and easily moveable crystal mass is obtained. It is to be pointed out that in the process described above a novel principle is used for separating the content of lime and phosphoric acid of the rock phosphate, respectively for preparation of phosphoric acid, namely concentrating the phosphoric acid mother liquor by removal of water in the shape of water of crystallization in the calcium nitrate of the composition $Ca(NO_3)_2.4H_2O$.

It will be seen that by use of nitric acid of 63,7% in theoretically required quantities just the entire water content of the acid is used up as water of crystallization.

In order to counteract the inconveniences which occur when the minimum of acid of said concentrations is used, mother liquor from prior operations may be introduced during the dissolving and crystallization stage of the process. The present invention relates to special practical measures in connection with this use of mother liquor.

A certain quantity of mother liquor is conveniently added already to the fresh nitric acid, or is together with the latter supplied to the phosphate rock to be dissolved. This mother liquor is supplied cold or warm and is suitably conveyed in counter-current with the gases and acid vapors evolved in the dissolving apparatus. The addition of a suitable quantity of mother liquor already in this first stage of the process effects a regulation of the temperature of the reaction between phosphate rock and nitric acid and makes it possible to maintain this temperature on a desired level f. i. at 75° C. Further the addition of mother liquor makes the reaction mass more fluid, and allows also an absorption and utilization of the nitric acid of the escaping vapors.

In order to render the mixture of liquid and solid substances which results after crystallization of calcium nitrate more fluid further quantities of cold mother liquor from prior operations may be added before or during the crystallization of calcium nitrate. The mother liquor which is to be supplied in this second stage of the process may be subjected to pre-cooling, or super-cooling, before it is supplied to the solution, from which the calcium nitrate is to crystallize. This solution proper may previously have been subjected to a partial cooling down to +5° C. or to about zero. Upon addition of super-cooled mother liquor of say 20° C. below zero in suitable quantities the entire mass may assume a temperature of f. i. 5° C. below zero. By this previous separate cooling of the mother liquor, the advantage is obtained that the interchange of heat with the cooling medium is realized in absence of greater quantities of solid calcium nitrate which might easily impede the free circulation of the phosphoric acid solution when this had to be cooled by direct interchange of heat.

A part of the cold mother liquor which leaves the system is very conveniently utilized for cooling of the reaction product of rock phosphate and nitric acid.

After the calcium nitrate crystals have been separated from the mother liquor on a filter or in a centrifugal machine the crystals may be washed with suitable liquids such as cooled concentrated nitric acid, a cooled saturated solution of calcium nitrate or of ammonium nitrate and such like. If nitric acid or a calcium nitrate solution is used for this purpose the wash-liquid is conveniently returned to the operation of dissolving phosphate rock with nitric acid, to which as already mentioned mother-liquor may also be added. Instead of nitric acid alone, even nitric acid which is cooled and saturated with calcium nitrate at a temperature of between zero and 10° below zero may be used for washing.

When the measures mentioned above are made use of, nitric acid of the said concentration may be used only in a minimum of excess, or even only in the theoretically required quantity, without offending against the two principal conditions for carrying out the new process successfully: First to have at least so much water present, eventually a suitable smaller surplus, as is consumed as water of crystallization by the calcium nitrate in the shape of $Ca(NO_3)_2.4H_2O$ and simultaneously to obtain a mass of crystals and mother liquor which is sufficiently fluid to avoid difficulties in the interchange of heat, transport, filtering, centrifuging and washing of the crystals.

When f. i. nitric acid of 60–65 per cent is used the manner of working described above makes it possible to obtain a quantity of calcium nitrate $Ca(NO_3)_2.4H_2O$ corresponding to as much as 95 per cent of the lime content of the solution, and after filtration of the crystals a mother liquor results, which f. i. may contain 35 per cent $P_2O_5$, some 1,5 per cent nitrogen in the form of nitric acid, some 1,5 per cent nitrogen as calcium nitrate and some 3 per cent calcium calculated as CaO.

The relative ratio of components may of course vary within wide limits according to the quantity of nitric acid used, the concentration and the degree of cooling. A product of the above named composition may easily be worked upon fertilizers of two or three components or upon various phosphate products free from nitric acid and lime.

If it is desired to make compound fertilizers with a considerably higher content of nitric acid nitrogen, the primary dissolution of phosphate rock may be carried out with such a surplus of nitric acid, that the desired quantity of nitrogen of the finished mixed product is supplied with this acid.

In the manner described a mother liquor may be obtained with a content of 30 per cent $P_2O_5$, 1,5 per cent nitrate nitrogen, 6,5 per cent nitric acid nitrogen and 3,0 per cent lime as calcium nitrate. This solution is so concentrated that when it in the finely divided state is neutralized with ammonia dry spreadable, two-componential fertilizers are immediately obtained with little or even without any supply of heat.

If potassium salts are admixed to or dissolved in the mother liquor prior to neutralization three-componential fertilizers are obtained.

The quantity of mother liquor which is returned to prior stages of the process may vary greatly according to the conditions under which these prior stages are carried out. Conveniently the quantity of mother liquor returned may correspond to the weight of phosphate rock and/or nitric acid entering the primary operation.

Further it proves convenient to add 20–40 per cent of this quantity of mother liquor already in the first stage of the process, i. e. during the dissolution of phosphate rock with nitric acid, while 60–80 per cent are added immediately before or during the crystallization of calcium nitrate. This crystallization may in known manner be carried out continuously in apparatus equipped with devices for stirring and cooling.

I claim:

1. In a process of dissolving phosphate rock in nitric acid and of separating the content of calcium nitrate and phosphoric acid from the solution so obtained by crystallization of the calcium nitrate, the steps which comprise adding one portion of the solution of phosphoric acid saturated with calcium nitrate which is obtained as mother liquor from a prior crystallization of calcium nitrate in the operation of dissolving phosphate rock with nitric acid and in supplying a second portion of such mother liquor to the reaction product of phosphate rock and acid during crystallization of calcium nitrate therefrom.

2. In a process of dissolving phosphate rock in nitric acid and of separating its content of calcium nitrate and phosphoric acid from the solution so obtained by crystallization of the calcium nitrate, the steps which comprise adding during the dissolving operation a portion of mother liquor from a prior crystallization of calcium nitrate after said mother liquor has been used for washing and cooling of the vapors and gases escaping from the dissolving of phosphate rock and in supplying a second portion of mother liquor to the reaction product of the phosphate rock and acid during crystallization of calcium nitrate therefrom.

ERLING JOHNSON.